United States Patent
Cooper et al.

(10) Patent No.: US 7,152,169 B2
(45) Date of Patent: Dec. 19, 2006

(54) METHOD FOR PROVIDING POWER MANAGEMENT ON MULTI-THREADED PROCESSOR BY USING SMM MODE TO PLACE A PHYSICAL PROCESSOR INTO LOWER POWER STATE

(75) Inventors: Barnes Cooper, Beaverton, OR (US); Grant H. Kobayashi, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 408 days.

(21) Appl. No.: 10/307,158

(22) Filed: Nov. 29, 2002

(65) Prior Publication Data
US 2004/0107374 A1 Jun. 3, 2004

(51) Int. Cl.
*G06F 1/32* (2006.01)
(52) U.S. Cl. ...................................... 713/320; 713/323
(58) Field of Classification Search ............... 713/300, 713/320, 323; 718/107; 712/32
See application file for complete search history.

(56) References Cited

U.S. PATENT DOCUMENTS

| | | | | |
|---|---|---|---|---|
| 5,367,697 A | * | 11/1994 | Barlow et al. | 713/330 |
| 5,515,538 A | * | 5/1996 | Kleiman | 710/260 |
| 5,655,124 A | * | 8/1997 | Lin | 713/322 |
| 5,669,003 A | * | 9/1997 | Carmean et al. | 713/322 |
| 5,737,615 A | * | 4/1998 | Tetrick | 713/324 |
| 5,764,999 A | * | 6/1998 | Wilcox et al. | 710/261 |
| 5,802,354 A | * | 9/1998 | Kubala et al. | 713/400 |
| 5,832,243 A | * | 11/1998 | Seeman | 710/310 |
| 5,963,738 A | * | 10/1999 | Yamaki et al. | 713/100 |
| 5,978,903 A | * | 11/1999 | Quimby et al. | 712/229 |
| 5,983,357 A | * | 11/1999 | Sun | 713/324 |
| 6,014,611 A | * | 1/2000 | Arai et al. | 702/132 |
| 6,016,548 A | * | 1/2000 | Nakamura et al. | 713/323 |
| 6,035,374 A | * | 3/2000 | Panwar et al. | 711/118 |
| 6,058,466 A | * | 5/2000 | Panwar et al. | 712/15 |
| 6,173,417 B1 | * | 1/2001 | Merrill | 714/15 |
| 6,209,106 B1 | * | 3/2001 | Kubala et al. | 713/500 |
| 6,272,618 B1 | * | 8/2001 | Tyner et al. | 712/31 |
| 6,282,645 B1 | * | 8/2001 | Yamaki | 713/100 |
| 6,308,279 B1 | * | 10/2001 | Toll et al. | 713/323 |
| 6,314,511 B1 | * | 11/2001 | Levy et al. | 712/217 |
| 6,363,439 B1 | * | 3/2002 | Battles et al. | 710/36 |
| 6,427,211 B1 | * | 7/2002 | Watts, Jr. | 713/320 |
| 6,442,700 B1 | * | 8/2002 | Cooper | 713/320 |
| 6,564,328 B1 | * | 5/2003 | Grochowski et al. | 713/320 |
| 6,687,838 B1 | * | 2/2004 | Orenstien et al. | 713/320 |
| 6,718,474 B1 | * | 4/2004 | Somers et al. | 713/322 |

(Continued)

FOREIGN PATENT DOCUMENTS

JP 5-333968 * 12/1993

OTHER PUBLICATIONS

Lonnie R. Welch et al., "Mapping Reusable Software Components onto the ARC Parallel Processor", IEEE 1990, pp. 499-502.*

*Primary Examiner*—Chun Cao
(74) *Attorney, Agent, or Firm*—David N. Tran

(57) ABSTRACT

A power management technique uses system management interrupt (SMI) to manage states of a processor that includes multiple logical processors. When the SMI is generated, the states of logical processors are verified. When all of the logical processors are idle, the physical processor is placed in a low power state.

39 Claims, 9 Drawing Sheets

U.S. PATENT DOCUMENTS

| | | | |
|---|---|---|---|
| 6,775,786 B1 * | 8/2004 | Toll et al. | 713/323 |
| 6,823,516 B1 * | 11/2004 | Cooper | 718/108 |
| 6,829,713 B1 * | 12/2004 | Cooper et al. | 713/320 |
| 6,834,353 B1 * | 12/2004 | Smith et al. | 713/320 |
| 6,836,849 B1 * | 12/2004 | Brock et al. | 713/310 |
| 6,839,828 B1 * | 1/2005 | Gschwind et al. | 712/20 |
| 6,845,456 B1 * | 1/2005 | Menezes et al. | 713/320 |
| 6,883,107 B1 * | 4/2005 | Rodgers et al. | 713/601 |
| 6,895,520 B1 * | 5/2005 | Altmejd et al. | 713/324 |
| 6,968,410 B1 * | 11/2005 | Bennett et al. | 710/260 |
| 2004/0044915 A1 * | 3/2004 | Bose et al. | 713/320 |
| 2004/0083478 A1 * | 4/2004 | Chen et al. | 718/107 |

* cited by examiner

METHOD FOR PROVIDING POWER MANAGEMENT ON MULTI-THREADED PROCESSOR BY USING SMM MODE TO PLACE A PHYSICAL PROCESSOR INTO LOWER POWER STATE

FIELD OF THE INVENTION

The present invention relates to the field of computer systems, more particularly relating to methods and apparatuses for power management in computer systems.

BACKGROUND

Computer systems are becoming increasingly pervasive in our society, including everything from small handheld electronic devices, such as personal digital data assistants and cellular phones, to application-specific electronic components, such as set-top boxes and other consumer electronics, to medium-sized mobile and desktop systems to large workstations and servers. To provide more powerful computer systems for consumers, designers strive to continually increase the operating speed of the processor. A by-product of increasing processor speed is an increase in the amount of power consumed. The increased power consumption reduces battery life.

A variety of techniques are known for reducing the power consumption in computer systems. For example, the Advanced Configuration and Power Interface (ACPI) Specification (Rev. 2.0a, Mar. 31, 2002) sets forth information about how to reduce the dynamic power consumption of portable and other computer systems. With respect to processors used in computer systems, different processor power states (or C states) are defined in the ACPI Specification.

Mobile computer systems have historically implemented a variety of C states to save power. C0 is a running state, where the processor is not idle, executing code and performing useful work. When the processor is idle (e.g., not executing any thread), the OS may place the processor into a halt state by issuing a processor halt sequence of instruction. For example, the OS may issue a "STI; HLT" (Enable Interrupts; Halt Processor) instruction sequence to place the processor into a halted state until an unmasked interrupt is registered. In the C1 state, the processor is able to respond to snoop transactions, and wake up very quickly to execute code or service bus master snoop transactions.

The processor may progressively cycle through lower states such as C2, C3 and C4 as necessary to save even more power. C2 is a stop grant or mobile "Quick Start" state, where typically clocks are gated off to a large portion of the die. The processor is able to service snoops in the C2 state. The C2 state also supports a fairly low latency exit to allow software to quickly resume execution.

C3 is a deep sleep state, where clocks may be gated either internally or externally to the entire processor. In the C3 state, the platform must allow some startup time for clocks to be restarted and the phase locked loops (PLLs) to re-lock. Typically, this induces approximately 100-microsecond exit latency but can achieve very low power levels since the dynamic component of power dissipation is eliminated, reducing power to leakage power levels. In the C3 state, the processor is unable to snoop bus master transactions. Lastly, the C4 state is a variation of the C3 state whereby clocks are stopped and the voltage is reduced to sub-operational levels (voltage sufficient only to maintain processor state). Since leakage power is related to the voltage applied to the part, the C4 state is extremely good at reducing processor power to extremely low levels.

Hyper-Threading Technology (HT) is a technology from Intel® Corporation of Santa Clara, Calif. that enables execution of threads in parallel using a single physical processor. A physical processor refers to a physical processor die, or in the case of the Intel Pentium® 4 Family of processors, a single package. HT incorporates two logical processors on one physical processor die. A logical processor is an independent processor visible to the OS, capable of executing code and maintaining a unique architectural state from other processors in a system. HT is achieved by duplicating the architectural state, with each architecture state sharing one set of processor execution resources.

HT is a form of simultaneous multi-threading technology (SMT) where multiple threads of software applications can be executed simultaneously on one physical processor. Because it is unlikely that threads in both logical processors will stall at the same moment, the shared execution unit is more effectively utilized resulting in higher overall performance at a given clock rate. When processors that support HT are implemented in the mobile computer systems, there are performance and power management issues that may need to be addressed.

BRIEF DESCRIPTION OF THE DRAWINGS

The following drawings disclose various embodiments of the present invention for purposes of illustration only and are not intended to limit the scope of the invention.

DETAILED DESCRIPTION

In one embodiment, a method for placing a physical processor into a low power state is disclosed. The physical processor may include two or more logical processors. A system management interrupt (SMI) is generated when the operating system (OS) issues a halt sequence of one or more instructions. When a software routine associated with the SMI verifies that all of the logical processors are idle, the physical processor is placed in a low power state.

In the following description, for purposes of explanation, numerous specific details are set forth in order to provide a thorough understanding of the present invention. It will be evident, however, to one skilled in the art that the present invention may be practiced without these specific details. In other instances, well-known structures, processes and devices are shown in block diagram form or are referred to in a summary manner in order to provide an explanation without undue detail.

Logical Processors

Figure 1:
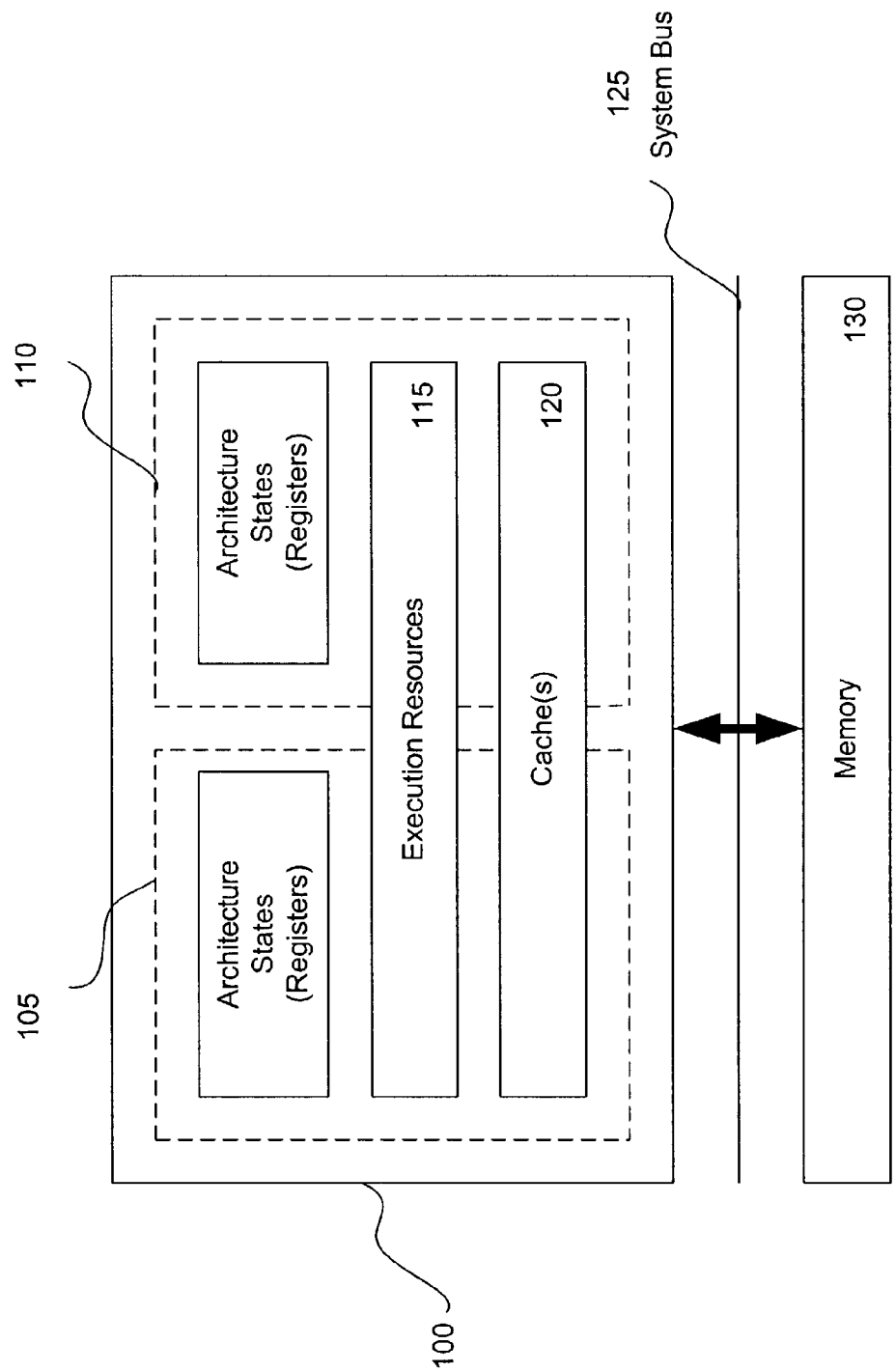
FIG. 1 is a block diagram illustrating an example of a processor that supports multiple logical processors.

FIG. 1 is a block diagram illustrating an example of a processor supporting multiple logical processors. Processor 100 may support two logical processors as one that supports, for example, Hyper-Threading Technology (HT). Processor 100 may include two architecture states 101 and 102 to make the processor 100 to be perceived as two logical processors 105 and 110. One skilled in the art may recognize that the physical processor may support more than two logical processors, with each being associated with one architecture state. The two logical processors 105 and 110 share the same execution resources 115, caches 120, system bus 125 and main memory 130. The physical processor 100 may schedule the threads in interleaved fashion depending on which of the logical processors 105 and 110 is available. It may be possible that, for example, the logical processor 110 is in the C0 state while the logical processor 105 is in the C1 state, or both in the C0 state, or both in the C1 state. When one logical processor is in the C1 state, the shared execution resources 115 may be freed up for the other non-idle logical processor to use.

Typically, mobile computer systems implement low power processor states to save power when the systems are idle. This may occur, for example, when the operating system (OS) has no threads in the running state or ready-to-run state. In situations where the computer systems include processors that do not support HT, a processor may be idle when there is no work to do. When the processor is idle, the OS may place the processor into the low power states (or C states). The way the OS policy is designed through ACPI is that the OS will cycle through the C states. For example, if the system is very busy and suddenly becomes idle, the OS will start placing the processor at the C1 state which is a very low rate C state that does not save very much power. When the processor is in the C1 state for a certain length of time, the OS will place the processor in the C2 state that may reduce more processor power. The OS then continues to progress through the C3 and C4 states when the processor has no work to do for a long time. Thus, using the example illustrated in FIG. 1, in a mobile computer system that includes a processor that supports multiple logical processors, when both logical processors 105 and 110 are idle, the physical processor 100 should be able to progressively enter the C1, C2, C3 and C4 state because any one of these states may further reduce processor power.

Figure 2:
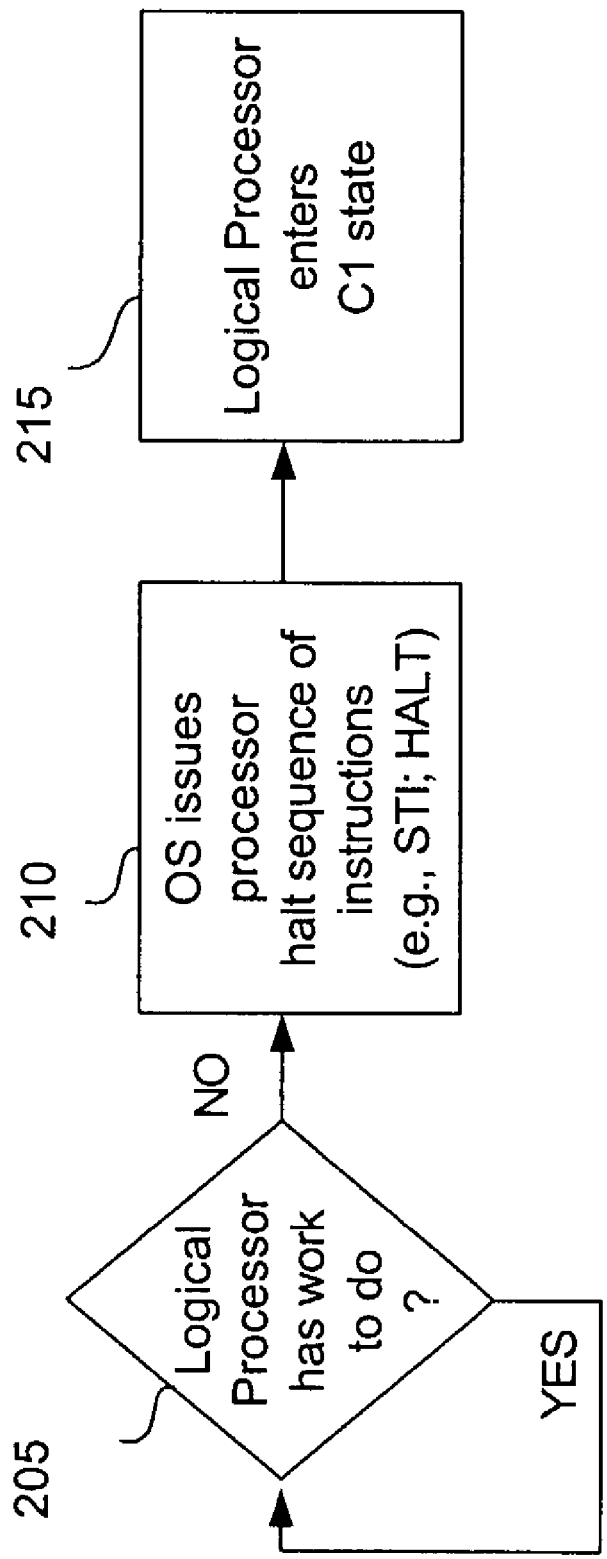
FIG. 2 is a block diagram illustrating an example of how current shipping operating systems operate when using with a processor that supports multiple logical processors.

FIG. 2 is a block diagram illustrating an example of how operating systems operate when using with a processor having multiple logical processors. Currently shipping operating systems (e.g., Windows XP and Windows 2000 products from Microsoft Corporation of Redmond, Wash.) that support multi-processors may be designed to work with multiple physical processors. As such, these operating systems may assume that each of the processors in the system is an independent entity that may be managed separately. For example, referring to FIG. 1, when either one of the logical processors 105 and 110 does not have any work to do (as shown in block 205), the OS issues the processor halt sequence of instructions, as shown in block 210. This halt sequence of instructions may place the idle logical processor into the C1 state, as shown in block 215. Subsequently, when the other logical processor becomes idle, it may also be placed into the C1 state System Management Mode (SMM)

For one embodiment, the logical physical processors 105 and 110 illustrated in FIG. 1 may support system management mode (SMM) for power management. SMM provides an environment for executing power management software routines or handlers that do not interfere with the performance of the OS or application programs. SMM may be entered by generating an SMI service request (referred to herein as SMI) using hardware or software. For example, when an SMI is sent to the logical processor 105, the logical processor 105 enters SMM and executes a SMM software routine in SMRAM address space to service the request associated with the SMI. An SMRAM address space is a memory address space that may be separate from the memory 130. The SMRAM address space may be provided on the physical processor 100 and may be used for storage and execution of SMM software routines. The SMRAM address space may be distinct from the memory 130 to ensure that the software routines running in SMM do not conflict with the OS or application software. SMM is known to one skilled in the art.

For one embodiment, in a processor that supports multiple logical processors (e.g., processors that support HT such as the processor 100 illustrated in FIG. 1), when a SMI is generated, both logical processors 105 and 110 may enter the SMM regardless of which of the logical processors 105 and 110 the SMI is sent to. The logical processors 105 and 110 may share the same SMRAM but may use a different area of SMRAM. For example, when the OS requires service from a software routine in the SMRAM associated with the logical processor 105, the OS may cause a SMI to be sent to the logical processor 105. OS execution may then be suspended. The logical processor 105 may then enter SMM. The logical processor 110 may also enter SMM. The logical processor 105 may then execute a software routine corresponding to the SMI in its SMRAM to service the request. The logical processor 105 may then exit the SMM. Exit from the SMM may be performed when the logical processor 105 executes a RSM (Resume) instruction. The logical processor 110 may also exit from the SMM. The OS execution may then continue.

Synchronization

Figure 3:
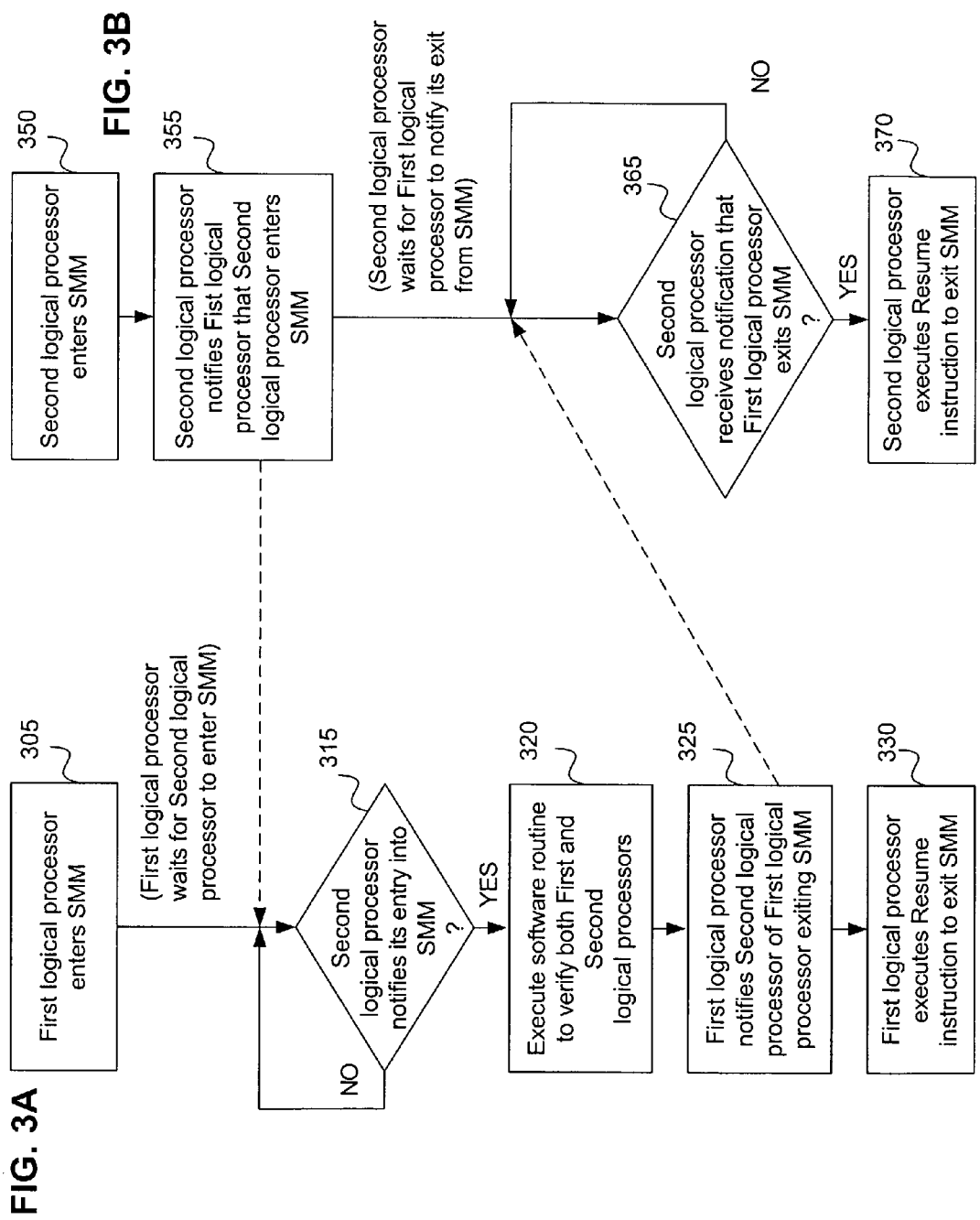
FIG. 3A is a flow diagram illustrating cross-processor synchronization by a first logical processor, according to one embodiment.
FIG. 3B is a flow diagram illustrating cross-processor synchronization by a second logical processor, according to one embodiment.

For one embodiment, synchronization may be performed to ensure that both logical processors 105 and 110 enter and exit SMM at the same time. When an SMI is generated, it may be sent to all processors (logical and/or physical). FIGS. 3A and 3B illustrate an example of synchronization processes according to one embodiment. When the first logical processor enters SMM, the first logical processor may have its instruction pointer (IP) pointing to an SMRAM base address, which may be a dedicated vector within the first logical processor.

Referring to FIG. 3A, upon entering SMM at block 305, the first logical processor (e.g., processor 105) may wait for the second logical processor (e.g., processor 110) to enter SMM. The first logical processor may wait in a loop until it receives a notification from the second logical processor that the second logical processor enters SMM, as shown in block 315. When the notification is received, the first logical processor may proceed with the execution of the software routine to process the SMI, as shown in block 320. It may be noted that this software routine may verify both the first logical processor and the second logical processor to determine if their states (e.g., idle, halted). Although not shown here, the software routine may also perform further tasks (e.g., placing the physical processor into a deeper sleep state) depending of the states of the first and second logical processors. When these tasks are completed, the process in FIG. 3A flows from block 320 to block 325 where the first logical processor notifies the second logical processor that it is about to exit SMM. At block 330, the first logical processor executes an instruction (e.g., resume) to exit SMM.

Referring to FIG. 3B, when the first logical processor enters SMM, the second logical processor also enters SMM, as shown in block 350. At block 355, the second logical processor notifies the first logical processor that it is in SMM. The second logical processor may wait for the first logical processor to notify when the first logical processor exits SMM. The second logical processor may wait in a loop until the notification is received from the first logical processor, as shown in block 365. When the notification is received from the first logical processor, the process in FIG. 3B flows from block 365 to block 370 where the second logical processor executes an instruction (e.g., resume) to exit SMM. The dotted line connecting block 355 of FIG. 3B to FIG. 3A illustrates an example of the notification sent by the second logical processor to the first logical processor. Similarly, the dotted line connecting block 325 of FIG. 3A to FIG. 3B illustrates an example of the notification sent by the first logical processor to the second logical processor.

For one embodiment, an SMI is generated before the OS issuing the processor halt sequence of instructions (e.g., STI; HALT). A chipset (not shown) associated with the physical processor 100 may be configured so that whenever a logical processor executes an I/O instruction to access a particular I/O port (or register address), an SMI is generated. The SMI enables the logical processors 105 and 110 to enter SMM while the OS sits on the I/O instruction waiting for the service for the SMI to complete. This allows the SMI to create a virtual I/O port in the computer system. While the SMI is being serviced, OS execution may be suspended. The OS state may be saved before entering SMM, and may be restored after exiting from SMM. OS execution may then resume at a next instruction. Other methods may also be used to generate an SMI. Using the I/O instruction described here may be advantageous because it may require only minimal change to the OS.

Figure 4:
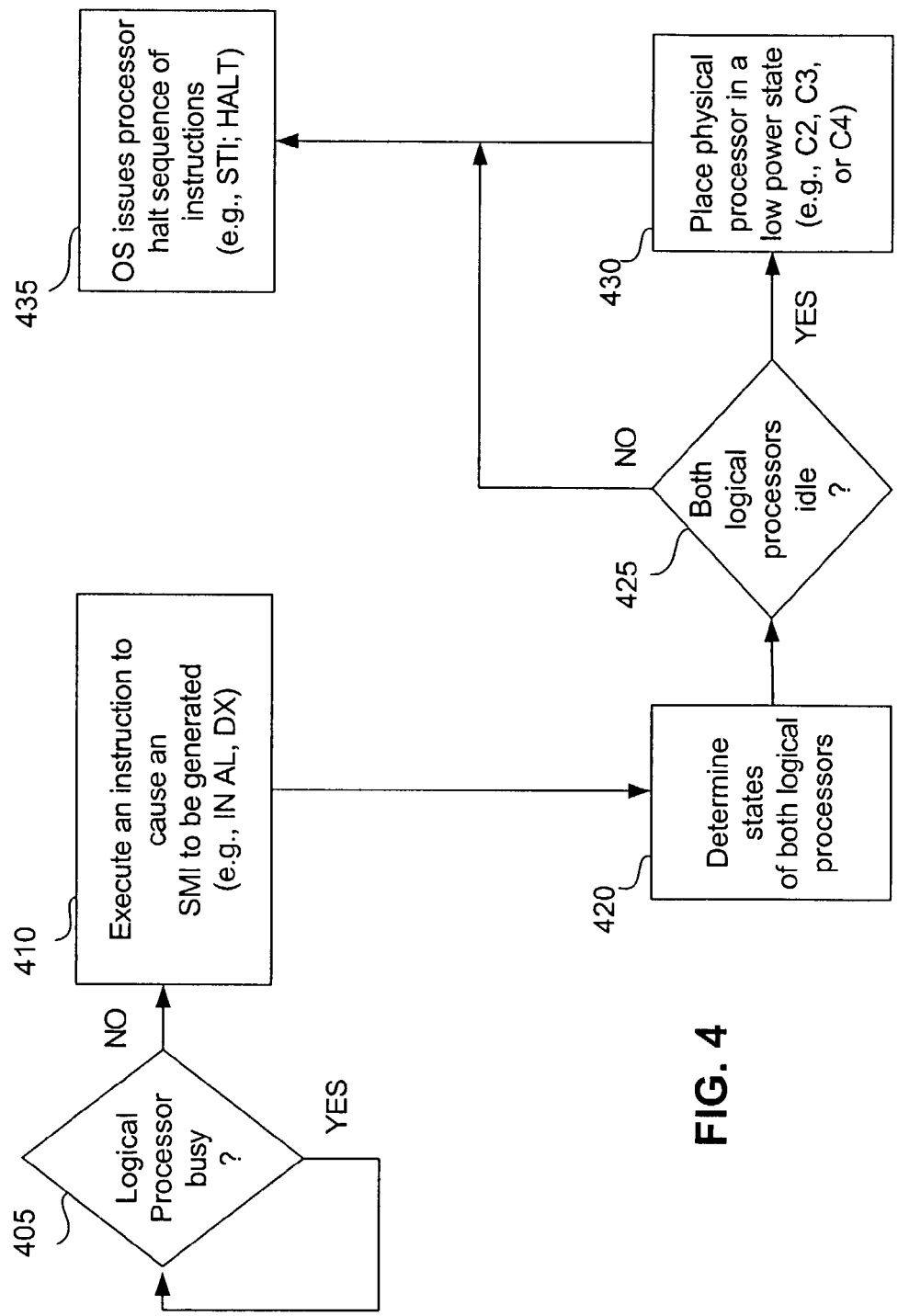
FIG. 4 is a flow diagram illustrating a process of placing the logical processors into a low power state, according to one embodiment.

FIG. 4 is a flow diagram illustrating a process used to place the logical processors into a low power state, according to one embodiment. The process in FIG. 4 is an improvement to the process illustrated in FIG. 2. For one embodiment, the I/O instruction may be inserted before the processor halt sequence of instructions. Execution of the I/O instruction causes an SMI to be generated. Using the I/O instruction allow the SMI to go in on top of the OS so that it is possible to determine if both of the logical processors 105 and 110 are idle. Referring to FIG. 4, when one logical processor is idle (as shown in block 405), the process flows from block 405 to block 410. At block 410, the processor may execute the I/O instruction and reads from the particular I/O port (e.g., as specified in the instruction operand). This may cause an SMI to be generated. At block 420, the software routine associated with the SMI may determine the states of both logical processors. There may be different combinations of logical processor states depending on the number of logical processors.

At block 425, a test is made to determine whether both logical processors 105 and 110 are currently idle (e.g., C1 state). If they are both idle, the process flows from block 425 to block 430. At block 430, the software routine places the physical processor 100 into a lower power C state (e.g., C2, C3, or C4). From block 430, the process flows to block 435 and OS execution is resumed. From block 425, if only one logical processor is idle and the other is busy, the process flows from block 425 to block 435 where the OS execution is resumed. The OS may issue the halt sequence of instruction (STI; HALT) and may believe that it places the logical processor into the C1 state. It may be noted that when both logical processors 105 and 110 are determined to be idle at block 425, and the physical processor 100 may be placed in a deeper sleep state (C2, C3, or C4), the OS may still think that the processor is in the C1 state because C1 is the only state that the OS supports.

It may also be noted that, for example, when the logical processor 105 executes the I/O read instruction that generates the SMI, that logical processor is ready to go idle (i.e., to be placed in the C1 state). The software routine may only need to verify the state of the other logical processor 110. It may be possible that both logical processors 105 and 110 may both issue the I/O read instructions to the particular I/O port at substantially the same time, and therefore they may both be ready to go idle. It may also be possible that one logical processor 105 may be ready to go idle while the other logical processor 110 may already be in an idle state (e.g., C1 state).

The software routine may verify the state of the other logical processor because it has access to the register states of both logical processors. The software routine may be able to locate the instruction pointer associated with the other logical processor and determine if the instruction last executed by that logical processor is an I/O instruction, a halt instruction, or another instruction. For example, when the instruction is an I/O instruction and it indicates that it is used to access the particular I/O port that would cause the SMI to be generated, then that logical processor just became idle. The I/O port may be verified by decoding the I/O instruction and confirming that the port address is pointing to the address that would cause the SMI to be generated. When the last instruction executed by the logical processor is a HALT instruction, then that logical processor is in an idle state. Furthermore, when the last instruction executed by the logical processor is something else, then that logical processor may be busy.

For one embodiment, when both logical processors 105 and 110 are busy, there is no need to interfere because it is better to let the logical processors 105 and 110 continue to do useful work. When only one logical processor (e.g., 105) is idle, the idle processor is placed in the C1 state while the non-idle logical processor (e.g., 110) continues to do useful work. When both logical processors 105 and 110 are idle, then they both may be placed in the C1 state. When both logical processors 105 and 110 have been idled, then it may be better to progressively place the physical processor 100 (and thus both logical processors 105 and 110) into a deeper C state (e.g., C2, C3 or C4) than C1 to get additional power savings.

Race Condition

When a logical processor is idle, the OS may place a logical processor into the low power states (or C states) many times per second. This is because the logical processor may wake up to service interrupts and bus master requests. Some interrupts may occur more frequently than others.

When an interrupt occurs, it may be sent to one logical processor, and that logical processor may then communicate that fact to the other logical processors.

Figure 5A:
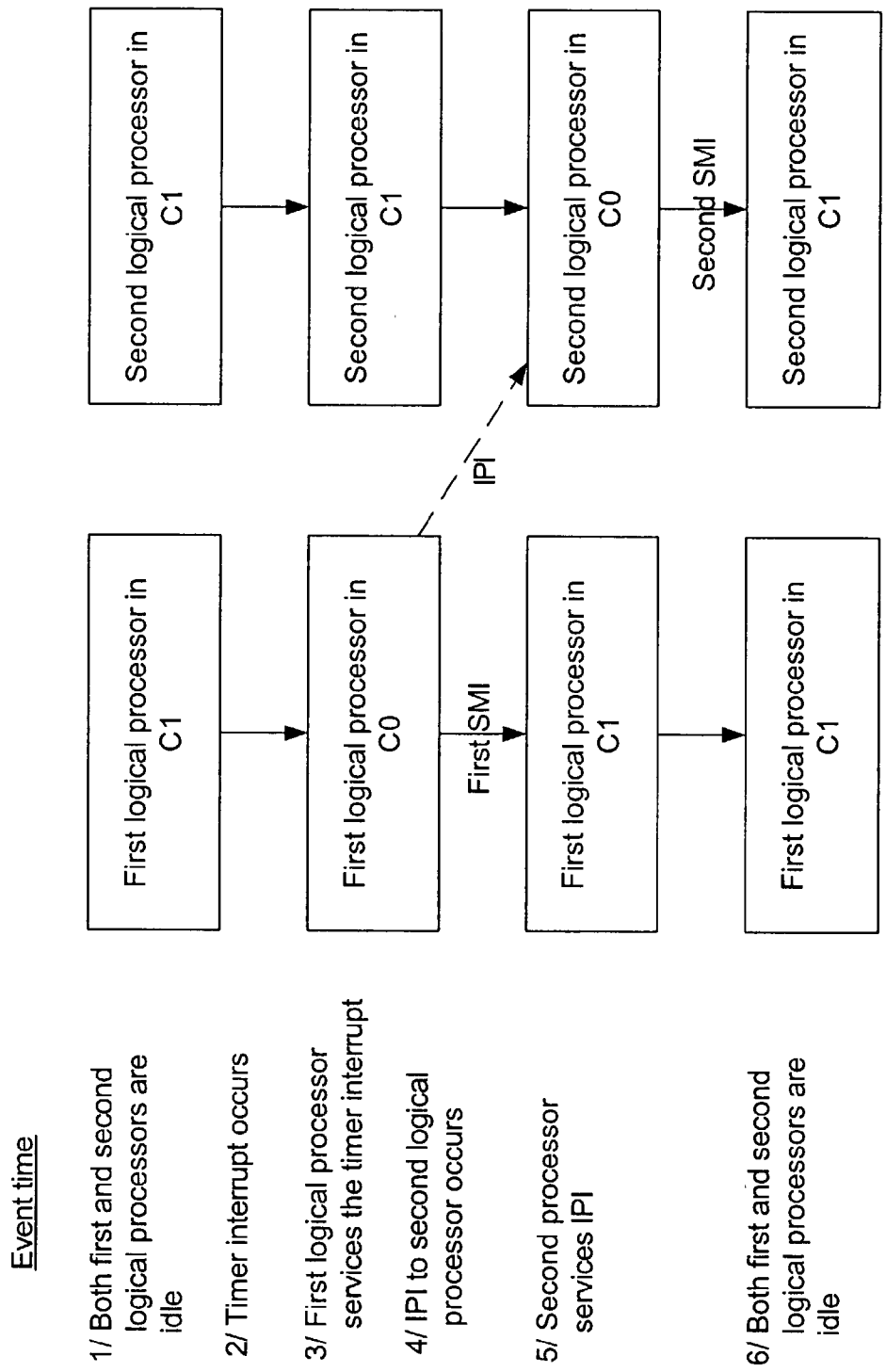
FIG. 5A is a block diagram illustrating an example of states of the logical processors when a timer interrupt occurs.

FIG. 5A is a block diagram illustrating an example of states of the logical processors when a timer interrupt occurs. In this example, initially at event time 1 both logical processors are idle and in a low power state (e.g., C1). At event time 2, a timer interrupt occurs. The timer interrupt may be an OS timer interrupt that occurs at, for example, every 15 milliseconds. The timer interrupt may first be sent to a lowest priority logical processor. In this example, the lowest priority logical processor is referred to as a first logical processor. Because the first logical processor is in a low power state, it may wake up and execute an interrupt service routine (ISR) corresponding to the timer interrupt. This is illustrated at event time 3, and the first logical processor is now in the C0 state. When the ISR is completed, the first logical processor may then send an IPI to the second (high priority) logical processor. This is illustrated as event time 4.

At this time, the first logical processor is ready to go back to sleep and may execute and I/O instruction to cause a first SMI to be generated. Meanwhile, the second logical processor receives the IPI and is ready to wake up. At event time 5, the second logical processor is in the C0 state to service the IPI. When the first logical processor receives the first SMI, both the first logical processor and the second logical processor enter SMM. At this time, the software routine in SMRAM detects that the second logical processor is busy (servicing the IPI) and the first logical processor is idle. As such, the first logical processor becomes the first one to enter the C1 state. Because the second logical processor is busy, the idle detection by the software routine fails to place the physical processor into a low power state.

The software routine may then exit SMM and may not change the state of the physical processor. At this time, the first logical processor may be in the C1 state, while the second logical processor may be in the C0 state. When the second logical processor completes servicing the IPI, it is ready to go idle and may execute an I/O instruction to cause a second SMI to be generated. Both the first and second logical processors then enter SMM. When in SMM, the idle detection of the software routine again verifies the states of both logical processors. The software routine then recognizes that the second logical processor is idle (e.g., by examining the I/O instruction) and makes the second logical processor the second one to enter the C1 state, illustrated as event time 6.

It may be noted that the second logical processor may wake up only to service the IPI sent from the first logical processor and may not do any other work. When servicing the IPI is completed, the second logical processor may then immediately return to a low power state (e.g., C1). When the second idle detection (resulting from the second SMI) is performed, and the physical processor ends up in the C1 state instead of C2, C3, or C4.

Figure 5B:
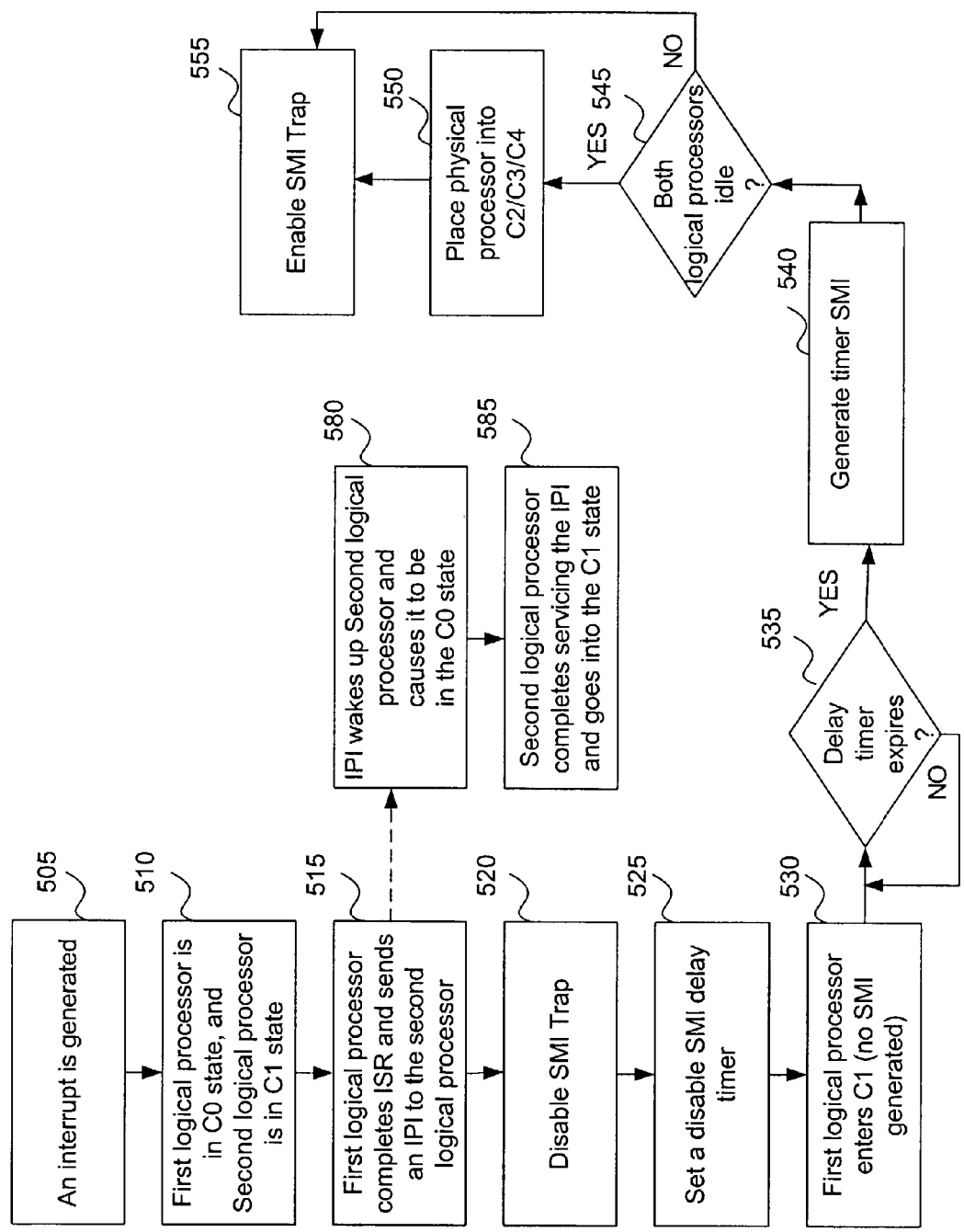
FIG. 5B is a flow diagram illustrating an example of a process using a short delay to place a processor support multiple logical processors into a low power state, according to one embodiment.

This race condition between the first logical processor entering a low power state and the second logical processor servicing an IPI may be a common event in computer systems that run current shipping OS such as, for example, Windows XP from Microsoft. FIG. 5B is a flow diagram illustrating an example of a process that uses a delay to place a processor that supports multiple logical processors into a low power state, according to one embodiment. The process described in this example provides one embodiment that may be used to overcome the race condition described above. For one embodiment, all of the logical processors are in a low power state. At block 505, an interrupt (e.g., a timer interrupt) occurs and is sent to one of the logical processors (e.g., a low priority logical processor). At block 510, the logical processor that receives the interrupt is placed in the active or C0 state. In this example, that logical processor is referred to as a first logical processor. Meanwhile, the other (or second) logical processor remains in the low power state (e.g., C1). As before, when the first logical processor completes the ISR associated with the interrupt, it sends an IPI to the second logical processor, as shown in block 515. The dotted line between block 515 and block 580 illustrates this communication. Block 580 is described below.

For one embodiment, the SMI trap is disabled, as shown in block 520. When the SMI trap is disabled, no SMI may be generated when the OS issues the I/O instruction described above. However, an SMI may still be generated by other events such as, for example, expiration of a timer, etc. This may prevent either the first or the second logical processor from entering SMM to verify their states for the purpose of placing them into one of the lower power states. In other words, this may prevent an idle logical processor from interfering with operation of a non-idle logical processor. For one embodiment, a delay timer may be set for a period of time that the SMI trap is disabled, as shown in block 525. That is, while the delay timer is going, no SMI may be trapped when a logical processor executes the I/O instruction, and therefore no entry into SMM may take place to verify the states of the first and second logical processors. The delay may be implemented, for example, as a software timer. The delay may allow the activities performed by the first and second logical processors to settle down before their states may be verified. Typically, the OS may operate with a normal timer that may generate a timer interrupt for every 15 milliseconds. As such, the delay may be set to a period shorter than the normal timer. For example, the delay may be set at 1.5 milliseconds or 2 milliseconds.

At block 530, the first processor enters the C1 state. It may be noted execution of the I/O instruction that normally would cause an SMI to be generated may not do so because the SMI trap has been disabled, as shown in block 525. At block 535, a test is made to determine if the delay timer expires. If it does not expire, the delay continues at block 535. If it expires, the process flows from block 535 to block 540. For one embodiment, when the timer described in block 535 expires, a timer SMI is generated, as shown in block 540. It may be noted that this may be a software timer SMI rather than the SMI generated by executing the I/O instruction as described above. At block 545, a test is made to determine if the logical processors are idle. If they are, the physical processor may be placed in a lower power state (C2/C3/C4), as shown in block 550. At block 555, the SMI trap is enabled. If the first and the second logical processors are idle when a next normal OS timer interrupt occurs (e.g., every 15 milliseconds), the process in FIG. 5 may repeat and the physical processor may be placed in a next lower power state or deeper sleep state. From block 545, when at least one of the logical processors is busy, the process flows to block 555 where the SMI trap is enabled.

This technique may significantly reduce the possibility that either of the first or the second logical processor is executing an ISR when SMM is entered. Typically, when a logical processor goes into a low power state, it may stay there for a long time, and the short delay time introduced by the delay timer (or short timer) may not be significant comparing to the power saving resulting from being able to place the physical processor 100 into a deeper sleep state.

Referring to FIG. 5B, when the second logical processor receives the IPI from the first logical processor, it wakes up and is in the C0 state instead of a low power state, as shown in block 580. The second logical processor then services the IPI. When the second logical processor completes the IPI, it may go into a low power state (e.g., C1), as shown in block 585. It may be noted that at this time the SMI trap is still disabled because of the operations described in block 520.

Backoff Policy

There may be situations when the SMI trapping occurs too frequently (i.e., too many SMI generated), and as a result the logical processors may spend too much time executing the software routine in SMRAM. For example, this may occur when the computer system is running applications that use a fast timer such as, for example, Window Media Player from Microsoft. The fast timer may generate a timer interrupt, for example, for every 1 millisecond. This is faster than the normal 15 milliseconds timer described above.

The fast timer may cause performance degradation to the computer system because the logical processors are spending more time handling SMIs and less time doing other work. For example, the computer system may be extremely busy such that none of the logical processors may be idle for a long time. That is, the logical processors may switch between the busy C0 state and the idle C1 state very frequently. Thus, if an SMI is generated each time a logical processor becomes idle, there may be too many SMIs to handle at the expense of performance.

Figure 6:
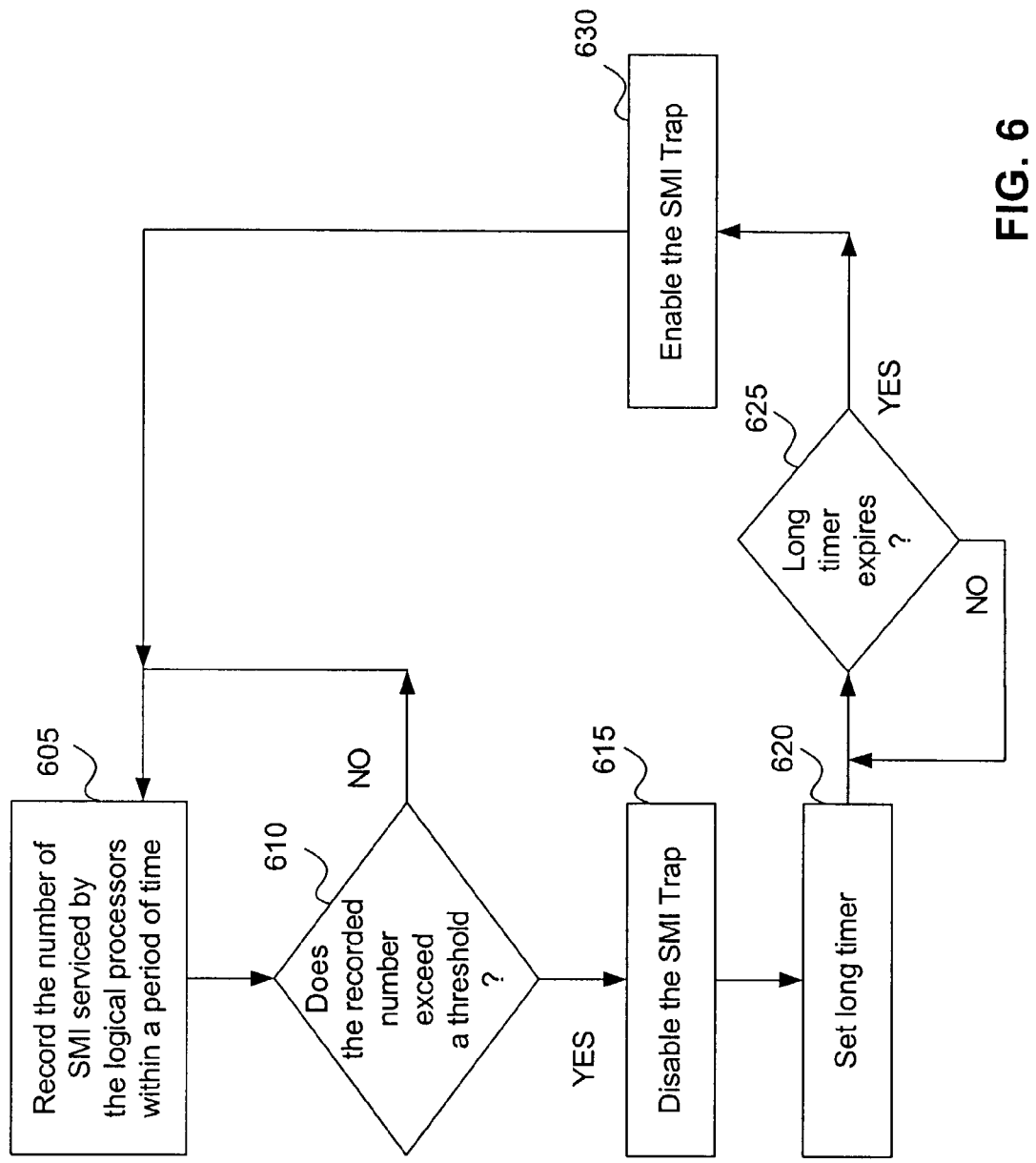
FIG. 6 is a flow diagram illustrating an example of a process that uses a delay timer to reduce the number of SMIs generated when using a processor that supports multiple logical processors, according to one embodiment.

FIG. 6 is a flow diagram illustrating an example of a process that uses a delay timer to reduce the number of SMIs generated when using a processor that supports multiple logical processors, according to one embodiment. The process described in this example provides one embodiment that may be used to overcome the fast timer condition described above. For one embodiment, the number of SMIs that the logical processors receive within a certain period may be recorded, as shown in block 605. This number may be referred to as SMI frequency (or SMI's frequency of occurrence). At block 610, a test is made to determine if the SMI frequency exceeds an SMI frequency threshold. When it does not exceed the threshold, the process flows to block 635 where SMI trapping continues.

From block 610, when the SMI frequency exceeds the SMI frequency threshold, the SMI trap is disabled, as shown in block 615. Other techniques may also be used to determine the SMI frequency for the purpose of improving processor performance. For example, the time that the logical processors spend handling the SMIs may be recorded such that when the SMI handler time becomes significant comparing with the available processor execution time, the SMI frequency may be reduced.

For one embodiment, each time the software routine in SMRAM confirms that both logical processors are idle and the physical processor is placed into a C2, C3, or C4 state, a system timer value may be read and recorded. This may be considered as a first timestamp. When a next C2, C3, or C4 condition is detected, the system timer may be read again. This may be considered as a second timestamp. The first timestamp and the second timestamp may be compared with one another. If the time difference between the two timestamps is too short comparing to a frequency threshold (i.e., the C state is verified too frequently), then the SMI trap may be disabled for a certain period of time. This may be referred to as a C state entry frequency.

For one embodiment, another delay timer may be used to set a period of time that the SMI trap is disabled, as shown in block 620. In this situation, because the logical processors may be extremely busy, it may be advantageous to set a long delay period (e.g., using a long timer) before the SMI trap may be again enabled. At block 625, a test is made to determine if the long timer expires. If it does not, the delay continues. If it expires, the process flows to block 630, where SMI trap is enabled. At this time, the recorded number of SMI may be reset to zero. The process then flows back to block 605 where SMI trapping continues. Although not shown, the operations performed in block 605 may also include reevaluating the states of the logical processors when a next SMI is generated.

The delay timer may be implemented, for example, as a software timer. The long delay period may be set at, for example, 64 milliseconds. This delay timer may be referred to as a long timer (as compared to the short timer described above). An optimal SMI frequency value may be implementation specific and may vary based on the SMI handler time. This technique may be advantageous because it may reduce the SMI frequency significantly (e.g., one SMI every 64 milliseconds), and it also may increase the performance of applications that use the fast timer.

Single Threaded Workloads

It is possible that the two logical processors 105 and 110 illustrated in FIG. 1 may not be both busy at the same time. In fact, there may be situations when only one logical processor executes instructions from one application, while the other logical processor remains idle. This is referred to as a single threaded workload. In this situation, since the OS does not recognize that the two logical processors share the same physical die, the idle logical processor may enter the C1 state, wake up at every timer interrupt (e.g., 15 milliseconds) and service the timer interrupt, generate an SMI, and reenter the C1 state. This servicing of the SMI by the idle logical processor may impact the performance of the busy logical processor running the single threaded workload because both the idle logical processor and the busy logical processor have to enter SMM.

Figure 7:
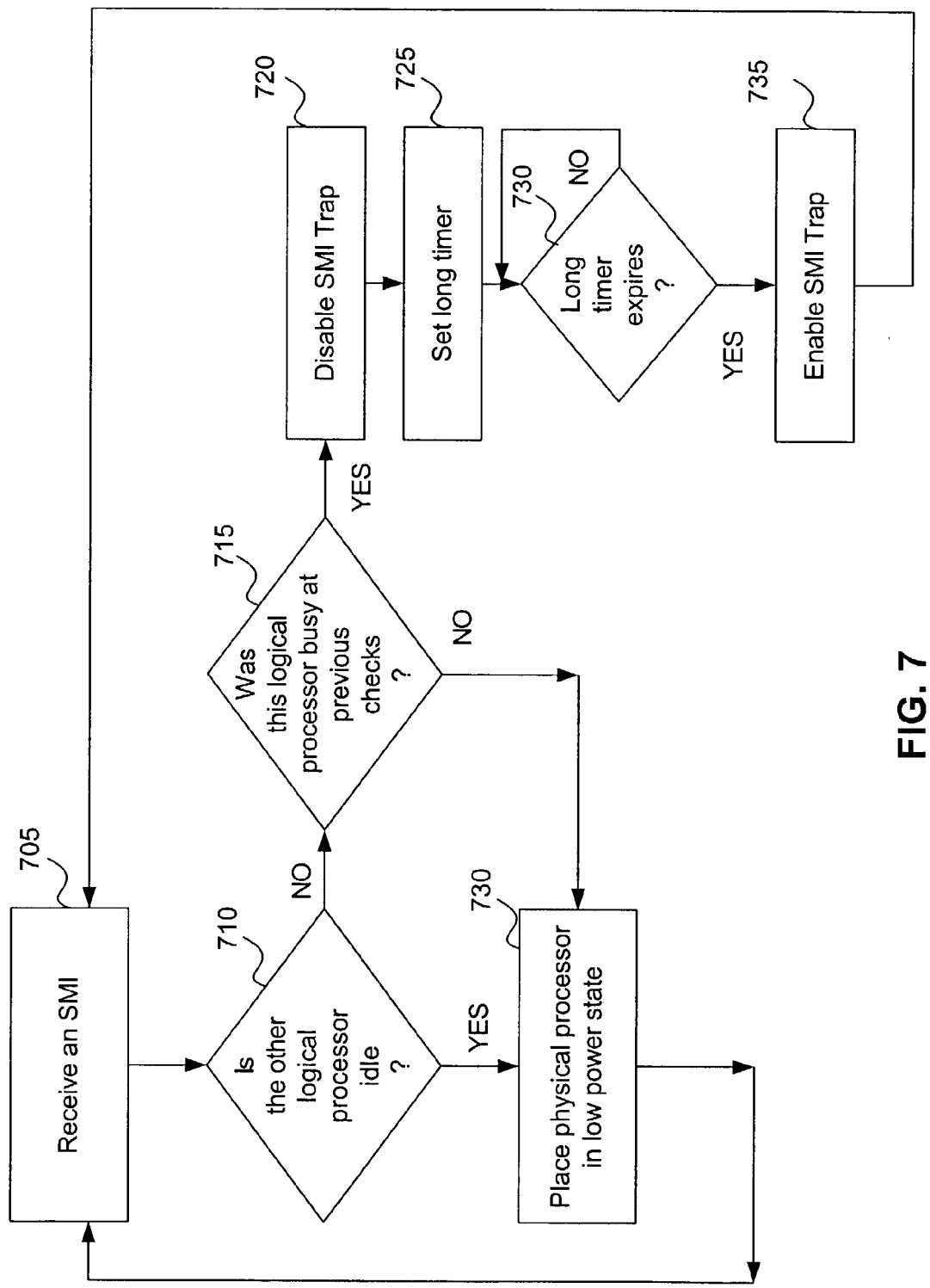
FIG. 7 is a flow diagram illustrating an example of a process that uses a delay timer to accommodate a single threaded workload when using a processor that supports multiple logical processors, according to one embodiment.

FIG. 7 is a flow diagram illustrating an example of a process of using a delay timer to accommodate a single threaded workload when using a processor that supports multiple logical processors, according to one embodiment. When there is a single threaded workload, it may be advantageous not to interfere with the execution time of the busy logical processor running the single threaded workload. For example, when the idle logical processor receives an SMI (as shown in block 705) and causes both the idle logical processor and the busy logical processor to enter SMM, the software routine may recognize that one of the logical processors is busy when it performs the verification, as shown in block 710. Normally, this may result in not being able to place the physical processor in a low power state and control may be returned to the OS.

For one embodiment, another test is performed to determine if the busy logical processor has been busy for a long time such that the test performed in block 710 repeatedly fails. When this is the case, it may be assumed that a single threaded workload exists. For one embodiment, when a single threaded workload is detected, the SMI trap is disabled, as shown in block 720. Furthermore, a delay timer may be set, as shown in block 725. The delay timer may be set for a long period of time (e.g., 64 milliseconds). From block 725, the process flows to block 730 where a test is made to determine if the delay timer expires. When the delay timer expires, the process flows to block 735 where the SMI trap is enabled. The process then flows to block 705 when a next SMI is generated.

From block 710, when both logical processors are idle, the process flows to block 730 where the physical processor is placed in a low power state. The process then flows to block 705 when a next SMI is generated.

In the above example when the delay timer is set at 64 milliseconds and the normal timer is set at 15 milliseconds, the technique described in FIG. 7 may reduce the amount of time spent in SMI by roughly 75%. As a result, execution performance of the single threaded workload may improve, and the impact of the SMI on the performance may be reduced. For one embodiment, when both logical processors are verified to be idle, it may be assumed that the single threaded workload is completed. At this time, it may be possible to remove the delay timer and resume the technique described in FIG. 4. It may be noted that the techniques described above in FIG. 5B, FIG. 6, and FIG. 7 may be used in combinations to improve the performance of the technique described in FIG. 4.

Figure 8:
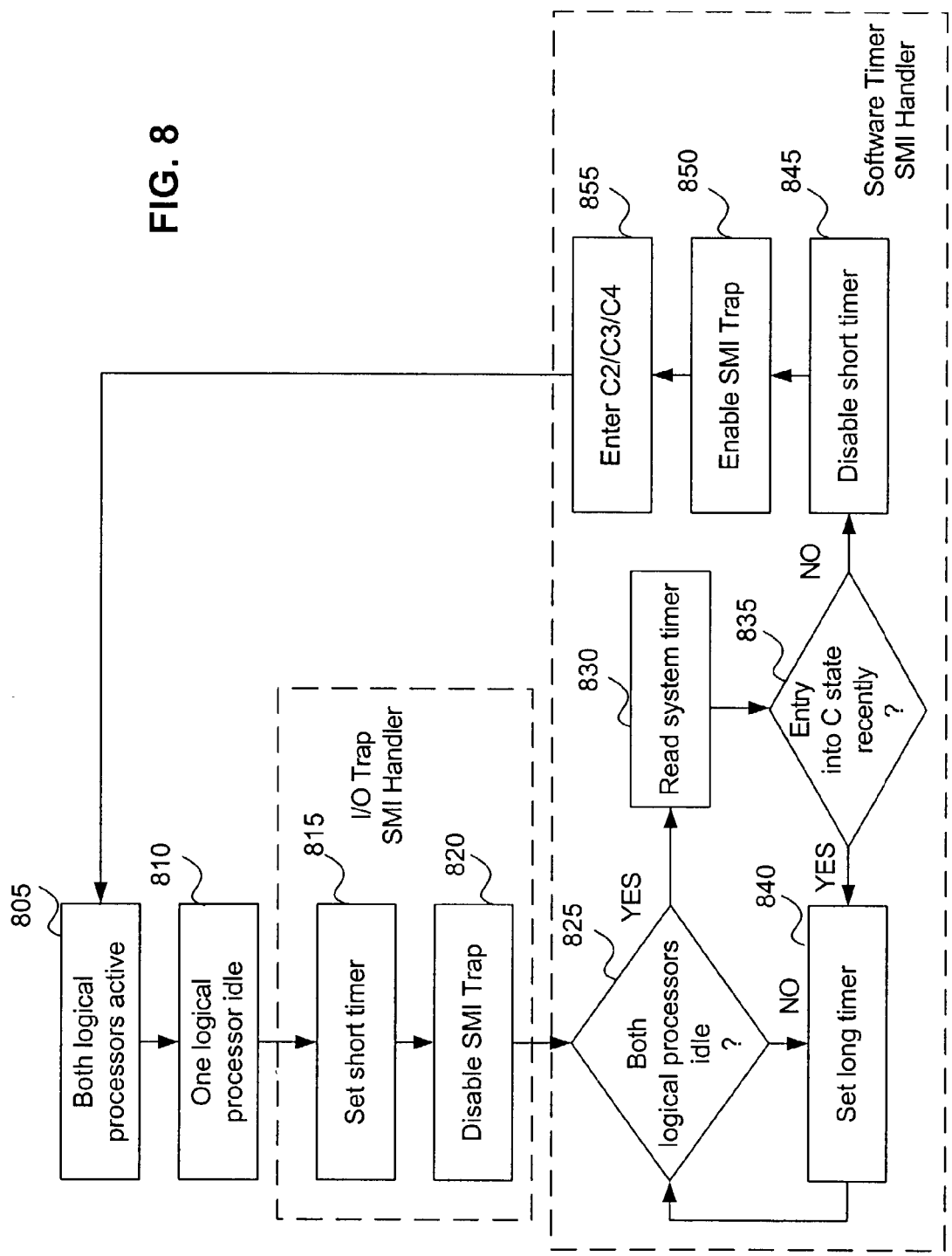
FIG. 8 is a flow diagram illustrating an example of a process that combines some of the techniques in FIGS. 4, 5B, 6 and 7.

FIG. 8 is a flow diagram illustrating an example of a process that combines some of the techniques described in FIGS. 4, 5B, 6 and 7. In this example, there are two logical processors, and both are initially in an active state, as shown in block 805. At block 810, one of the logical processors is idle or thinks that it is idle. An SMI is generated (because of an I/O instruction), and the process enters the SMI handler stage. During this stage, a short timer is set, as shown in block 815. Furthermore, the SMI trap may be disabled, as shown in block 820. The operations in blocks 815 and 820 may help prevent the race condition.

After the SMI handler stage, the process enters a timer SMI handler stage. The SMI handler stage is entered when the short timer expires and a timer SMI is generated. At block 825, a test is made to determine if both logical processors are idle. If at least one of the processors is idle, the process flows to block 840 where a long timer is set. This may help with the single threaded workload situation.

From block 825, if both logical processors are idle, another test may be made to determine if the logical processors enter the C state condition too frequently. This may be done using the C state entry frequency technique described above. For example, timestamps may be determined by reading the system timer (shown at block 830), and the C state entry frequency test may be made at block 835 to determine if the last entry was done recently (e.g., within the last 9 milliseconds). If the C state entry occurs too frequently, then the process flows to block 840 where a long timer is set. This is the back off policy.

From block 835, if the C state entry frequency test passes (i.e., not too frequent), an idle condition is successfully detected, and the process flows to block 845. At block 845, the short timer is disabled. At block 850, the SMI trap is enabled, and at block 855, the physical processor enters a low power state (C2/C3/C4). From block 855, the process may flow back to block 805.

Computer Readable Media

The operations of these various methods may be implemented by a processor that supports multiple logical processors in a computer system, which executes sequences of computer program instructions that are stored in a memory that may be considered to be a machine-readable storage media. The memory may be random access memory, read only memory, a persistent storage memory, such as mass storage device or any combination of these devices. Execution of the sequences of instruction may cause the processor to perform operations according to the processes described in FIGS. 4, 5B, 6, 7 and 8, for example.

The instructions may be loaded into memory of the computer system from a storage device or from one or more other computer systems (e.g. a server computer system) over a network connection. The instructions may be stored concurrently in several storage devices (e.g. DRAM and a hard disk, such as virtual memory). Consequently, the execution of these instructions may be performed directly by the processor.

In other cases, the instructions may not be performed directly or they may not be directly executable by the processor. Under these circumstances, the executions may be executed by causing the processor to execute an interpreter that interprets the instructions, or by causing the processor to execute a compiler which converts the received instructions to instructions that which can be directly executed by the processor.

In other embodiments, hard-wired circuitry may be used in place of or in combination with software instructions to implement the present invention. Thus, the present invention is not limited to any specific combination of hardware circuitry and software, nor to any particular source for the instructions executed by the computer system.

Methods and systems for placing processors that support multiple logical processors (e.g., processors that support HT) into lower power states have been disclosed. By using SMM, the states of each of the logical processors are examined. When they are all idle, the physical processor that includes the logical processors may be placed in a lower power state.

Although the present invention has been described with reference to specific exemplary embodiments, it will be evident that various modifications and changes may be made to these embodiments without departing from the broader spirit and scope of the invention as set forth in the claims. For example, although processors supporting HT are described as having two logical processors, the techniques described may also be applicable when there are more than two logical processors. Accordingly, the specification and drawings are to be regarded in an illustrative rather than a restrictive sense.

What is claimed is:

1. A method, comprising:
   using system management mode (SMM) to place a physical processor into a lower power state, the physical processor including multiple logical processors, the multiple logical processors sharing execution resources within the physical processor, wherein placing the physical processor into the lower power state comprises:
   enabling an system management interrupt (SMI) trap;
   executing an instruction that generates a SMI to verify states of the logical processors;
   keeping track of SMI frequency; and
   when the SMI frequency exceeds an SMI frequency threshold, disabling the SMI trap for a first period of time.

2. The method of claim 1, wherein the instruction that generates the SMI is an input/output (I/O) instruction that accesses a predetermined register.

3. The method of claim 1, wherein the SMI trap is disabled to reduce the SMI frequency.

4. The method of claim 3, wherein the SMI trap is enabled after expiration of the first period of time.

5. The method of claim 1, wherein when the states of all of the logical processors are verified to be idle, the physical processor is placed into the lower power state.

6. The method of claim 5, wherein when the state of a first logical processor is verified to be non-idle, the physical processor remains in a current state.

7. The method of claim 6, wherein when the physical processor includes two logical processors, and when the state of a second logical processor is repeatedly verified to be idle and the state of the first logical processor is repeatedly verified to be non-idle during a same time period, the SMI trap is disabled for a second period of time.

8. The method of claim 7, wherein the SMI trap is disabled to enable the first logical processor to operate without being interfered by the second logical processor during the second period of time.

9. The method of claim 8, wherein after expiration of the second period of time, the SMI trap is enabled.

10. The method of claim 1, after the SMI is generated, further comprises:
disabling the SMI trap for a third period of time to enable communication among the logical processors to settle down;
generating a timer SMI when the third period of time expires;
verifying the states of the logical processors, wherein when the states of all of the logical processors are idle, the physical processor is placed in the lower power state; and
enabling the SMI trap.

11. The method of claim 1, further comprising:
keeping track of C state entry frequency; and
when the C state entry frequency exceeds a C state entry frequency threshold, disabling the SMI trap for a fourth period of time to reduce the C state entry frequency.

12. The method of claim 1, wherein the physical processor is a processor that supports Hyper-Threading Technology (HT).

13. A computer readable storage medium containing executable instructions which, when executed in a processing system, causes the processing system to perform a method comprising:
enabling a system management interrupt (SMI) trap to verify states of two or more logical processors in a physical processor;
placing the physical processor into a lower power state when the states of the logical processors are verified to be idle;
generating a SMI; and
when a number of SMI generated exceeds a threshold, disabling the SMI trap.

14. The computer readable storage medium of claim 13, wherein the SMI trap is disabled for a first period of time.

15. The computer readable storage medium of claim 13, wherein the physical processor includes a first logical processor and a second logical processor, and when the state of the first logical processor is repeatedly verified to be idle and the state of the second logical processor is repeatedly verified to be non-idle, the SMI trap is disabled for a second period of time to enable the first logical processor to operate without being interrupted by the SMI during the second period of time.

16. The computer readable storage medium of claim 13, further comprising:
disabling the SMI trap for a third period of time to enable communication among the logical processors to settle down; and
generating a timer SMI when the third period of time expires.

17. The computer readable storage medium of claim 16, after the timer SMI is generated, further comprising:
verifying the states of the logical processors;
when the logical processors are idle, placing the physical processor into the lower power state; and
enabling the SMI trap.

18. The computer readable storage medium of claim 17, wherein placing the physical processor into the lower power state comprises:
determining if the physical processor was recently placed in the low power state, and if so, disabling the SMI trap for a fourth period of time to reduce frequency of placing the physical processor into the low power state.

19. A system, comprising:
a physical processor, the physical processor includes a first logical processor and a second logical processor, wherein the state of the physical processor is managed by generating a system management interrupt (SMI) to verify states of the first logical processor and the second logical processor, the first and second logical processors sharing execution resources within the physical; and
a first timer coupled to the physical processor, wherein the first timer is used to reduce SMI frequency when the SMI frequency exceeds a first predetermined threshold or when a C state entry frequency exceeds a second predetermined threshold.

20. The system of claim 19, wherein when the first logical processor and the second logical processor are verified to be idle, the physical processor is placed into a low power state.

21. The system of claim 19, further comprising a second timer coupled to the physical processor, wherein the second timer is used to allow for inter-processor communication among the logical processors before a next SMI is generated, the second timer is set for a shorter time than the first timer.

22. The system of claim 21, further comprising a third timer coupled to the physical processor, wherein the third timer is used to allow the first logical processor to process a single threaded workload when the second logical processor is idle.

23. The system of claim 22, wherein the third timer delays the SMI to be generated while the second logical processor is idle, and wherein the third timer is set for a longer time than the second timer.

24. A system, comprising:
a memory;
a physical processor coupled to the memory, the physical processor including a first logical processor and a second logical processor, wherein system management mode (SMM) is used to enable placing the physical processor into a low power state, the first and the second logical processors sharing execution resources within the physical; and
a first timer coupled to the physical processor to reduce frequency of entering the SMM, wherein the frequency of entering the SMM is reduced to enable processing of a single threaded workload by the first logical processor when the second logical processor is idle.

25. The system of claim 24, wherein the SMM is used to verify states of the logical processors.

26. The system of claim 25, wherein when the states of the logical processors are verified to be idle, the physical processor is placed into the low power mode.

27. The system of claim 24, wherein the frequency of entering the SMM is reduced when both the first logical processor and the second logical processor are busy.

28. The system of claim 24, further comprising a second timer coupled to the physical processor, the second timer used to delay entering the SMM to allow inter-processor communication between the first logical processor and the second logical processor to settle down.

29. A method, comprising:
receiving a first system management interrupt (SMI) associated with a first logical processor;
determining if both the first logical processor and a second logical processor are idle, the second logical processor coupled to the first logical processor;
when both the first and the second logical processors are determined to be idle, placing a physical processor into a low power state, the physical processor including the first and second logical processors; and
setting a long timer to delay receiving a second SMI when both the first logical and second logical processors are determined to be busy.

30. The method of claim 29, further comprising:
when the second logical processor is not idle, leaving the physical processor in a current power state.

31. The method of claim 29, further comprising:
setting a long timer to delay receiving a second SMI when the physical processor is placed into the low power state too frequently.

32. The method of claim 29, further comprising:
setting a short timer to delay receiving a second SMI when inter-processor communication occurs between the first and second logical processors.

33. A computer readable storage medium containing executable instructions which, when executed in a processing system, causes the processing system to perform a method comprising:
receiving a first system management interrupt (SMI) when an instruction is processed by a first logical processor or by a second logical processor at a first time, the second logical processor coupled to the first logical processor;
determining if both the first logical processor and the second logical processor are idle;
when both the first logical processor and the second logical processor are determined to be idle, placing a physical processor into a low power state, the physical processor including the first logical processor and the second logical processor; and
disabling a second SMI from being generated using a first timer when the instruction is processed at a second time by the first logical processor or by the second logical processor.

34. The computer readable storage medium of claim 33, further comprising:
when at least one of the first logical processor and the second logical is not idle, keeping the physical processor in a current power state.

35. The computer readable storage medium of claim 33, wherein the second SMI is disabled from being generated to allow for inter-processor communication between the first logical processor and the second logical processor.

36. The computer readable storage medium of claim 33, wherein upon expiration of the first timer, a timer SMI is received.

37. The computer readable storage medium of claim 36, further comprising:
disabling the second SMI from being generated using a second timer when both the first logical processor and the second logical processor are determined to be busy.

38. The computer readable storage medium of claim 37, further comprising:
disabling the second SMI from being generated using the second timer when the first logical processor is busy and the second logical processor is idle.

39. The computer readable storage medium of claim 38, further comprising:
enabling the second SMI to be generated when the second timer expires.

* * * * *